(12) United States Patent
Bremicker et al.

(10) Patent No.: US 9,806,516 B2
(45) Date of Patent: Oct. 31, 2017

(54) METHOD AND DEVICE FOR PROTECTING SEVERAL STRINGS OF A PHOTOVOLTAIC GENERATOR FROM REVERSE CURRENTS

(71) Applicant: SMA Solar Technology AG, Niestetal (DE)

(72) Inventors: Sven Bremicker, Alheim (DE); Adrian Haering, Niestetal (DE); Matthias Walter, Kassel (DE); Henrik Wolf, Kassel (DE); Joachim Laschinski, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 61 days.

(21) Appl. No.: 14/737,712

(22) Filed: Jun. 12, 2015

(65) Prior Publication Data

US 2015/0280423 A1    Oct. 1, 2015

Related U.S. Application Data (63) Continuation of application No. PCT/EP2013/076114, filed on Dec. 10, 2013.

(51) Int. Cl.
| | |
|---|---|
| *H02J 1/00* | (2006.01) |
| *H02J 3/00* | (2006.01) |
| *H02H 7/10* | (2006.01) |
| *H02M 1/32* | (2007.01) |
| *H02M 3/155* | (2006.01) |
| *H02J 3/38* | (2006.01) |
| *H02J 7/35* | (2006.01) |
| *H02H 11/00* | (2006.01) |
| *H02M 3/02* | (2006.01) |
| *H02H 7/20* | (2006.01) |

(52) U.S. Cl.
CPC ............ *H02H 7/10* (2013.01); *H02H 11/002* (2013.01); *H02J 1/00* (2013.01); *H02J 3/383* (2013.01); *H02J 7/35* (2013.01); *H02M 1/32* (2013.01); *H02M 3/02* (2013.01); *H02M 3/155* (2013.01); *H02H 7/20* (2013.01); *Y02E 10/563* (2013.01); *Y10T 307/653* (2015.04)

(58) Field of Classification Search
CPC ............... H02J 3/383; H02J 7/35; H02H 7/10
USPC .......................................................... 307/71
See application file for complete search history.

(56) References Cited

U.S. PATENT DOCUMENTS

| | | |
|---|---|---|
| 2007/0107767 A1 | 5/2007 | Hayden et al. |
| 2008/0150366 A1* | 6/2008 | Adest ...................... H02J 3/383 307/77 |
| 2009/0236917 A1 | 9/2009 | Bettenwort et al. |

FOREIGN PATENT DOCUMENTS

| | | |
|---|---|---|
| DE | 10120595 A1 | 11/2001 |
| DE | 102009032288 A1 | 1/2011 |
| EP | 2282388 A1 | 2/2011 |

(Continued)

*Primary Examiner* — Carlos Amaya
(74) *Attorney, Agent, or Firm* — Eschweiler & Potashnik, LLC (57) ABSTRACT

In order to protect reverse currents, several strings of a photovoltaic generator, which are connected in small groups respectively via a DC/DC-converter, parallel to a common DC voltage intermediate circuit, the current which flows over each of the DC/DC-converter is detected and if a reverse current is detected flowing through one of the DC/DC converters, the converter is stopped by controlling the DC/DC-converter.

16 Claims, 3 Drawing Sheets

(56) References Cited

FOREIGN PATENT DOCUMENTS

EP 2284973 A1 2/2011

\* cited by examiner

METHOD AND DEVICE FOR PROTECTING SEVERAL STRINGS OF A PHOTOVOLTAIC GENERATOR FROM REVERSE CURRENTS

CROSS REFERENCE TO RELATED APPLICATIONS

This application claims priority to International Patent Application number PCT/EP2013/076114, filed on Dec. 10, 2013 which claims priority to German Patent Application number 10 2012 112 184.2 filed on Dec. 12, 2012 and is hereby incorporated by reference in its entirety.

FIELD

The disclosure relates to a method and a device for the reverse current protection of a number of strings of a photovoltaic generator being connected in parallel to a common DC link.

BACKGROUND

Reverse currents are defined as currents flowing in the opposite direction to the currents generated by the photovoltaic generator in normal operation.

Where a number of strings of a photovoltaic generator are connected in parallel to a common DC link, a reverse current may arise e.g. if an individual string is in shadow, and thus the intermediate circuit voltage delivered by the other, unshadowed strings of the DC link causes a reverse current to flow through the shadowed string.

The constituent photovoltaic modules in the strings of a photovoltaic generator will not be damaged by small reverse currents. However, where a plurality of strings are connected in parallel, the risk will arise that an individual string which is in shadow or which, for other reasons, delivers a significantly lower output voltage than the strings connected in parallel, will receive currents from all the remaining strings in the form of reverse currents. The string concerned will rapidly be overloaded as a result.

If a string with an incorrect polarity is connected on a common bus connection with a number of other strings, it will short-circuit the other strings connected on the bus connection. The resulting short-circuit current, i.e. the sum of the currents generated by the other strings, will not flow back through the string connected with an incorrect polarity, but will therefore flow counter to the forward direction of a correctly connected string. In any case, the high short-circuit current in all the other strings will constitute a potential source of damage to the string connected with an incorrect polarity. The overloading of the affected string may also cause further damage—specifically, the outbreak of fire may occur as a result of the overheating of components in the affected string.

From EP 2 284 973 A1, a photovoltaic installation with a plurality of strings is known, each of which is comprised of a number of photovoltaic modules connected exclusively in series. The strings are connected to one another in parallel on bus lines. A transformer feeds electrical energy from the bus lines into a grid system. By the regulation of the transformer, it is possible to adjust the voltage released between the bus lines. Each string is provided with a current sensor which, as a minimum requirement, detects whether a reverse current is flowing to the string, and indicates said reverse current to the control system. The control system reduces the voltage between the bus lines, thereby interrupting the reverse current. Accordingly, the individual strings are not provided with a reverse current-blocking diode. The current sensors are preferably arranged in a number of decentralized terminal units. A number of strings in the field are connected in parallel to the terminal units by means of a pair of connecting cables, and these connecting cables are then routed to a central unit which incorporates the transformer. The central unit is provided with terminals for the connection of the central terminal units to the bus lines.

From EP 2 282 388 A1, a device is known for the in-feed of electrical energy from a plurality of strings of photovoltaic modules into a grid system. The device is provided with a connection for each string, which incorporates means for overcurrent protection and for the selective tripping of the string. Each string is customarily comprised, not only of a series circuit of photovoltaic modules, but of a regular arrangement of multiple sub-strings, which are combined to form a parallel circuit. Means for overcurrent protection and for the selective tripping of individual strings are each provided with a power circuit-breaker, with a motor-driven opening and closing system, connected in series to a current sensor between the relevant string and a bus line. The bus line is connected to an inverter.

From DE 101 20 595 A1, a solar energy system comprising a standard solar cell chain and a sub-standard solar cell chain is known. The DC voltage delivered by the sub-standard solar cell chain is raised to the level of the DC output voltage from the standard solar cell chain by means of a booster unit. The DC voltage from the standard solar cell chain and the raised DC voltage are fed to an inverter, which generates an AC voltage which is then delivered to an electric power supply system. A reverse current-blocking diode is arranged respectively between the standard solar cell chain and the booster unit on one side, and the inverter on the other side. The booster unit may be configured as a voltage-raising circuit, i.e. as a boost converter.

From DE 10 2009 032 288 A1, a photovoltaic installation is known. The photovoltaic installation is comprised of photovoltaic modules, which are connected to form a number of module strings, and are protected against reverse currents. The module strings are connected to dedicated DC/DC converters, and the outputs from the DC/DC converters are fed to the input of a common inverter. The DC/DC converters are arranged in at least one generator terminal box, which is physically separated from the inverter. One or two module strings may be connected to each DC/DC converter. Where two module strings are connected per DC/DC converter, string protection facilities may be omitted. Where only one module string is connected per DC/DC converter, string diodes may also be omitted, as the galvanic isolation function delivered by the DC/DC converters inhibits any reverse current. As no further control function is available on the galvanically-isolating DC/DC converters, the current can be prevented by the DC/DC converters. Any additional DC isolating point may be omitted accordingly. Moreover, the individual module strings may be disconnected, without disconnecting the entire photovoltaic installation.

From US 2007/0107767 A1, a DC generating system is known, comprised of a number of strings of energy-generating cells connected in parallel to bus lines. The current flowing through each string is measured by a current sensor. Each string is also provided with a switching module, for the connection of the relevant string to the bus lines, the disconnection or short-circuiting thereof by means of a dynamic load.

SUMMARY

The disclosure includes a method and a device for reverse current protection of a number of strings in a photovoltaic generator, which are connected in parallel to a common DC link, the execution of which is associated with only minimal hardware expenditure.

The disclosure relates to a method for reverse current protection of a number of strings of a photovoltaic generator being connected to a common DC link in parallel in small groups respectively via a corresponding DC/DC converter, whereby the current flowing through each of the DC/DC converters is detected, and a reverse current flowing through one of the DC/DC converters is inhibited by the control of the DC/DC converter. It is understood that not every small reverse current will necessarily be inhibited by one of the DC/DC converters, but that a threshold value can be set for a reverse current to be inhibited by each of the DC/DC converters. The unnecessary tripping of the control function on the DC/DC converter for the inhibition of the reverse current can be avoided accordingly.

The disclosure furthermore relates to a device for reverse current protection of a number of strings of a photovoltaic generator, which are connected to a common DC link in parallel in small groups respectively via a corresponding DC/DC converter. In one embodiment each DC/DC converter is associated with a current sensor detecting the current flowing via the DC/DC converter, whereby a central control system is configured to inhibit the flow of a reverse current through one of the DC/DC converters by the control of the DC/DC converter. The device according to the disclosure may be configured as part of an energy-generating installation.

By the method or the device according to the disclosure, it is possible to achieve a fail-safe operation of a higher-order energy-generating installation. This means that any individual fault will not induce or maintain an unsafe, or potentially fire-inducing condition in the energy-generating installation. This performance can be achieved with no additional components, by means of an appropriate control system.

In this context, a string is understood as a series circuit of a number, in general a plurality of photovoltaic modules. In principle, a string may comprise a number of sub-strings connected in parallel. However, this is often not the case.

In this context, a reverse current through a DC/DC converter is understood as a current whereby electrical energy from the DC link flows in the strings which are connected via the DC/DC converter to the DC link. I.e. a reverse current through a DC/DC converter flows in the opposite direction to the current which should be flowing from the strings to the DC link. A reverse current of this type through a DC/DC converter is indicative of a fault which is associated with a critical current, specifically a reverse current, through one of the connected strings. This will apply, even where the reverse current through the DC/DC converter is only small and, accordingly, the associated reverse current through one of the connected strings is not critical. In the present disclosure, only the currents flowing through the DC/DC converters are monitored for reverse currents. Overload protection in all the connected strings can nevertheless be achieved.

In this context, a small group is understood as a sufficiently small number of strings such that neither a reduction in the output voltage of one of the strings associated with shadowing, or other reasons, nor the connection of one of the strings with an incorrect polarity, shall cause the current from the remaining strings in the small group flowing through one string to result in damage to the string. This will be ensured if the small group comprises two strings, or even a single string. In one embodiment the group will be comprised of two strings, in the interests of maximum security, but also as a means of halving the number of DC/DC converters, in comparison to an arrangement with only one string per DC/DC converter.

According to the disclosure, a reverse current flowing through one of the DC/DC converters, which might result in the overloading of a connected string, is inhibited by the appropriate control of the DC/DC converter. In principle, this is achieved in an arrangement whereby the DC/DC converter in which the reverse current occurs is controlled in order to effect the interruption of the reverse current. A control facility of this type will be available e.g. where the DC/DC converters are configured as buck converters. In many instances, however, this is not the case.

In one embodiment any reverse current flowing through one of the DC/DC converters should be inhibited by the control of the remaining DC/DC converters, thereby interrupting the flow of current from the string connected thereby to the common DC link. This will be possible e.g. even where the DC/DC converters are configured as boost converters.

Where the DC/DC converters are configured as boost converters, which can be used for the independent MPP tracking of connected strings, any reverse current flowing through one of the DC/DC converters can be inhibited by the closure of the boost converter switches of the remaining DC/DC converters. This closure of the boost converter switches short-circuits the remaining DC/DC converters. The boost converter diodes of the remaining DC/DC converters will prevent the short-circuiting of the DC link as well by the boost converter switches.

Prior to the closure of the boost converter switches of the remaining DC/DC converters, an attempt may be made to inhibit the reverse current flowing through one of the DC/DC converters by the opening of the boost converter switches in the remaining DC/DC converters. The boost function of the latter will be tripped accordingly, and the voltage on the common DC link, which generates the reverse current, will be reduced.

In this form of embodiment of the disclosure, provided that the boost converter diodes are in serviceable condition, these will also protect the individual DC/DC converters against the occurrence of reverse currents. This means that a reverse current from the DC link flowing through one of the DC/DC converters can only occur if the associated boost converter diode is defective, and is no longer executing its blocking function. Only the boost converter diodes can prevent the application of currents generated by the strings in other sub-groups to strings, which are connected with an incorrect polarity.

If only one of the two strings in a sub-group is connected with an incorrect polarity, the current sensor of the associated DC/DC converter will register no current, or an unusually low current, through the DC/DC converter. If both strings in the relevant sub-group are connected with an incorrect polarity, or the sub-group incorporates only one string which is connected with an incorrect polarity, the current sensor will register a limited reverse current. As this case already subsumes the occurrence of two faults, it is not relevant to the appraisal of fail-safety, but is considered here for the purposes of the further description of the disclosure. Conversely, a defective boost converter diode, in combination with a reverse current from the remaining strings, connected via the remaining DC/DC converters, will result in an increased reverse current, which will flow if the boost converter switch is open, but will be short-circuited if the boost converter switch is closed. In this way, it will be possible to distinguish these cases by the analysis of the occurrence of the reverse current, specifically by reference to the magnitude thereof and/or its dependence upon the circuit state of the associated boost converter switch. Accordingly, a fault signal can conceivably be generated which corresponds to the analysis result. As a minimum, the fault signal can indicate an initial state, which is associated with a defective boost converter diode, and a second state, which corresponds to the connection of one or more strings with an incorrect polarity.

The above description assumes that the current sensors of the DC/DC converter, configured as a boost converter, are arranged at the string-side input end of the DC/DC converter, i.e. ahead of the relevant boost converter switch.

If, according to the disclosure, a reverse current has been inhibited by the closure of the boost converter switches of the remaining DC/DC converters, configured in the form of boost converters, the boost converter switch of the DC/DC converter via which the reverse current has occurred will be permanently open. In this case, the strings of the DC link which are connected to the latter via this DC/DC converter will at least be fed with sufficient electrical energy to permit the emergency operation of a connected inverter or the control function thereof, which can also be supplied from the DC link.

If, in a device according to the disclosure, one or more strings, via an inverter configured as a boost converter, are connected with an incorrect polarity on the DC link, which simultaneously features a defective boost converter diode, the closure of the boost converter switches of the remaining DC/DC converters will also result in the interruption of the reverse current, provided that the latter originates from the strings connected to the remaining DC/DC converters. In this case, however, which is likewise not relevant to the appraisal of fail-safety due to the occurrence of multiple independent faults, after the opening of the boost converter switch of the DC/DC converter in which the reverse current occurs, there will be no charging of the DC link by the connected strings, at least not with the desired polarity. In this specific configuration, the closure of the boost converter switch of the boost converter which incorporates the defective boost converter diode will be advantageous.

The current sensors of the device according to the disclosure, which are allocated to the individual DC/DC converters, are necessary for the execution of separate MPP tracking with the individual DC/DC converters, anyway. The boost converters are the DC/DC converters which are used to execute separate MPP tracking of this type on individual strings in "multi-string inverters". The disclosure exploits only the boost converter switches and the boost converter diodes of such boost converters. Additional switches or diodes are not necessary. In other words, in a multi-string inverter which is provided with a number of boost converters connected in parallel for separate MPP tracking, the disclosure can be effected mainly by software modifications, provided that the current sensors of the individual DC/DC converters are also suitable for the detection of reverse currents.

Advantageous further developments of the disclosure are indicated in the patent claims, the description and the drawings. The advantages of characteristics and of combinations of multiple characteristics specified in the description are provided by way of example only, and may be achieved alternatively or cumulatively, without the advantages necessarily proceeding from forms of embodiment according to the disclosure. With no resulting amendment to the subject matter of the attached patent claims, the following remarks will apply to the content disclosed in the original application documents and the patent: further characteristics—specifically the relative arrangement and mutual interaction of multiple components—may be observed from the drawings. The combination of characteristics of different forms of embodiment of the disclosure, or of characteristics of different patent claims is also possible, notwithstanding the selected objects of reference in the patent claims, and is proposed accordingly. This also applies to characteristics which are represented in separate drawings, or are specified in the description thereof. These characteristics may also be combined with characteristics of different patent claims. Likewise, characteristics described in the patent claims may not be relevant to further forms of embodiment of the disclosure.

In respect of number, the characteristics specified in the patent claims and in the description are assumed to be present in the exact number specified, or in a greater number than that specified, with no requirement for the explicit use of the adverbial phrase "at least". For example, where reference is made to one element, it is to be understood that exactly one element, two elements or more elements are present. These characteristics may be supplemented by further characteristics, or may be the only constituent characteristics of the product concerned.

The reference numbers included in the patent claims do not constitute any restriction of the scope of the subject matter protected by the patent claims. Their sole purpose is to facilitate the understanding of the patent claims.

BRIEF DESCRIPTION OF THE DRAWINGS

The disclosure is further clarified and described hereinafter, with reference to the preferred forms of embodiment represented in the figures.

DETAILED DESCRIPTION

The present disclosure concerns the protection of strings, or of energy-generating installations and structures such as buildings which are associated with energy-generating installations or in which the latter are installed, against overloads of this type. It is desirable that a degree of protection should be provided whereby, in case of the occurrence of any given individual fault, these installations will be securely protected.

The present disclosure is specifically intended for application in a photovoltaic installation in which the DC link is configured as an intermediate input circuit of an inverter, which feeds energy generated by the photovoltaic generator into a public AC grid system.

Figure 1:
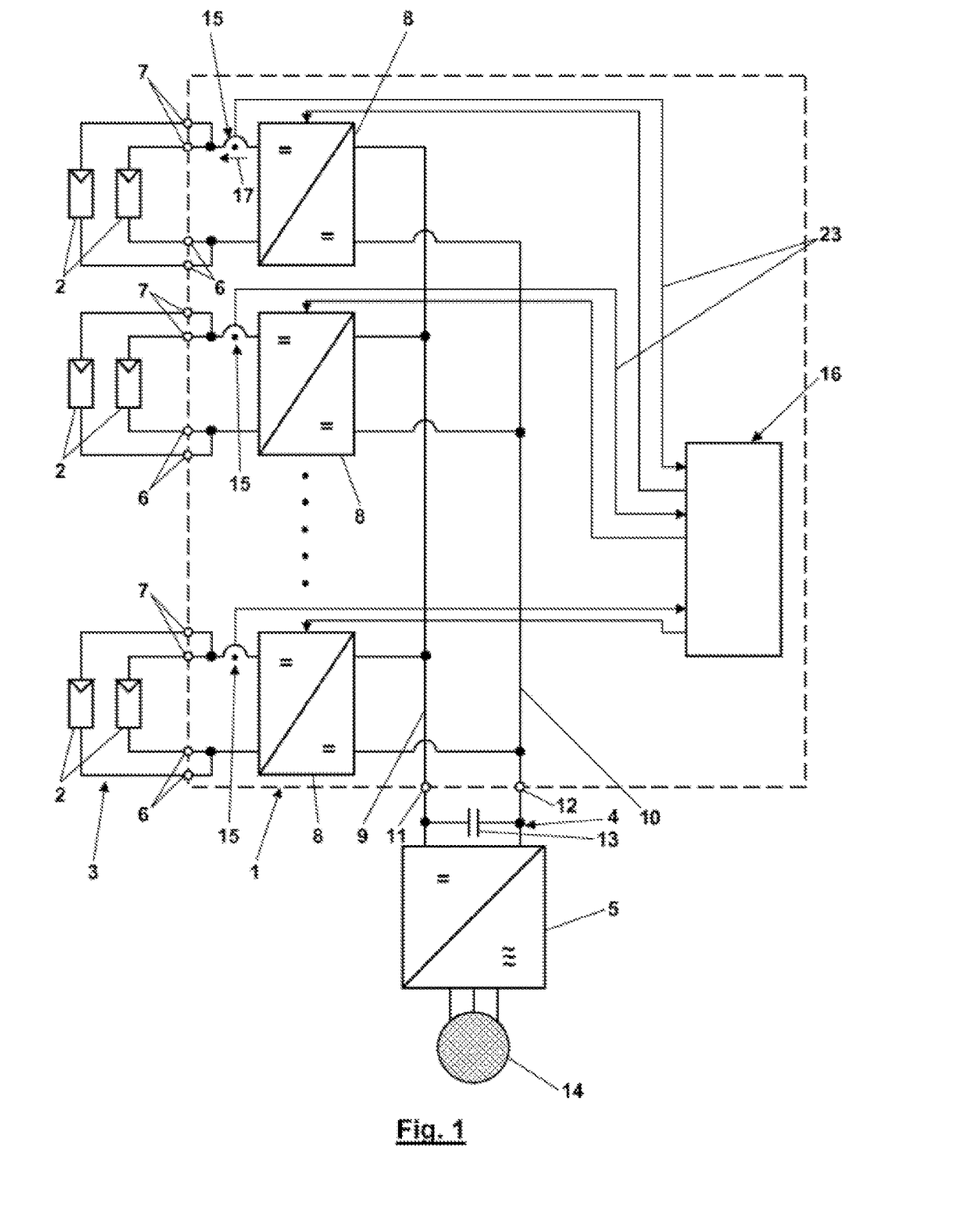
FIG. 1 shows a block diagram of a device according to the disclosure, which is connected between individual strings of a photovoltaic generator and an intermediate input circuit of an inverter.

FIG. 1 shows a device 1, which is connected between the individual strings 2 of a photovoltaic generator 3 and a DC link 4 of an inverter 5. The strings 2 are each comprised of a plurality of photovoltaic modules or photovoltaic cells connected in series, which are not illustrated in detail here.

For each string 2, the device 1 is provided with a pair of terminals 6, 7. In each case, two terminals 6 and the associated two terminals 7 in the device 1 are assembled such that the strings 2 connected thereto form a parallel circuit directly at the input of the device 1. These strings 2 connected in parallel are then each connected via a DC/DC converter 8 to bus lines 9 and 10. The bus lines 9 and 10 are routed via terminals 11 and 12 in the device 1 to the DC link 4, which is symbolized here by an intermediate circuit capacitor 13. The inverter 5 feeds electrical energy from the DC link 4 into an AC grid system 14.

In order to maximize the available electrical energy in the DC link 4, the DC/DC converters 8 are configured for the individual MPP tracking of the strings 2 connected thereto. This means that the DC/DC converters 8 are configured to adjust the working point, i.e. the operating voltage, of the strings 2 connected thereto, in relation to the voltage of the DC link 4, such that the electric power generated by the strings 2 is maximized. In addition to the output voltage of the strings 2, the current flowing in the relevant DC/DC converter 8 must also be measured, in order to determine the current power output. Current is measured by means of a current sensor 15.

The current sensor 15 is also used to detect the occurrence of reverse currents, flowing opposite to the normal current flow direction of the strings 2 in the DC link 4. Reverse currents of this type may jeopardize the integrity of the strings 2, specifically where these currents originate from many other strings 2, which then flow through the individual strings concerned. Where a reverse current of this type flows through one of the DC/DC converters 8, a control device 16 receiving the currents, in particular the reverse currents, measured by the current sensors 15 as input signals 23, controls the DC/DC converter 8 such that the reverse current is inhibited. The precise action to be undertaken for this depends on the type of the DC/DC converter 8.

If the DC/DC converters 8 are configured e.g. as buck converters, the buck converter switches of the remaining DC/DC converters, in which no reverse current is present, may be opened, in order to isolate the strings 2 connected thereto from the DC link 4. The DC link 4 will then be charged only by the strings 2 to which the reverse current was previously flowing. In each case, the control system 16 for the inhibition of the reverse current will only control the DC/DC converters 8 provided for individual MPP tracking, and will not control any additional isolating switches or similar. Likewise, no additional diodes are provided for the inhibition of a reverse current. It is assumed that, in each pair of strings 2 connected to a DC/DC converter 8, a reverse current can flow from one to the other, as this reverse current is limited to the current generated by the first of these strings 2. Even the connection of a string 2 with an incorrect polarity, such that it short-circuits a string connected in parallel, will result at most in the flow of a short-circuit current from one string 2 through the two strings 2 connected to a DC/DC converter 8. Such a current value can be accommodated by the strings 2 permanently, with no resulting damage or overheating. If, in a form of embodiment not represented, three strings 2 are connected to a DC/DC converter 8, polarity reversal in an individual string 2' will, at most, correspond to the current loading of this string with double the short-circuit current, generated by the two other strings. Even this loading can be accommodated by many strings permanently and without damage. In many cases, the configuration with three strings is therefore advantageous, on the grounds of the reduced number of DC/DC converters for a given number of strings. Conversely, in the case of load-sensitive modules, the configuration with only two strings 2 per DC/DC converter 8 is desired.

FIG. 1 represents a total of three DC/DC converters 8, each with two strings 2 connected. In principle, however, fewer DC/DC converters 8, and consequently fewer strings 2 may also be present. Specifically, the number of DC/DC converters 8 and the number of strings 2 connected thereto may be higher. Specifically, three strings 2 may also be connected to each DC/DC converter 8.

Figure 2:
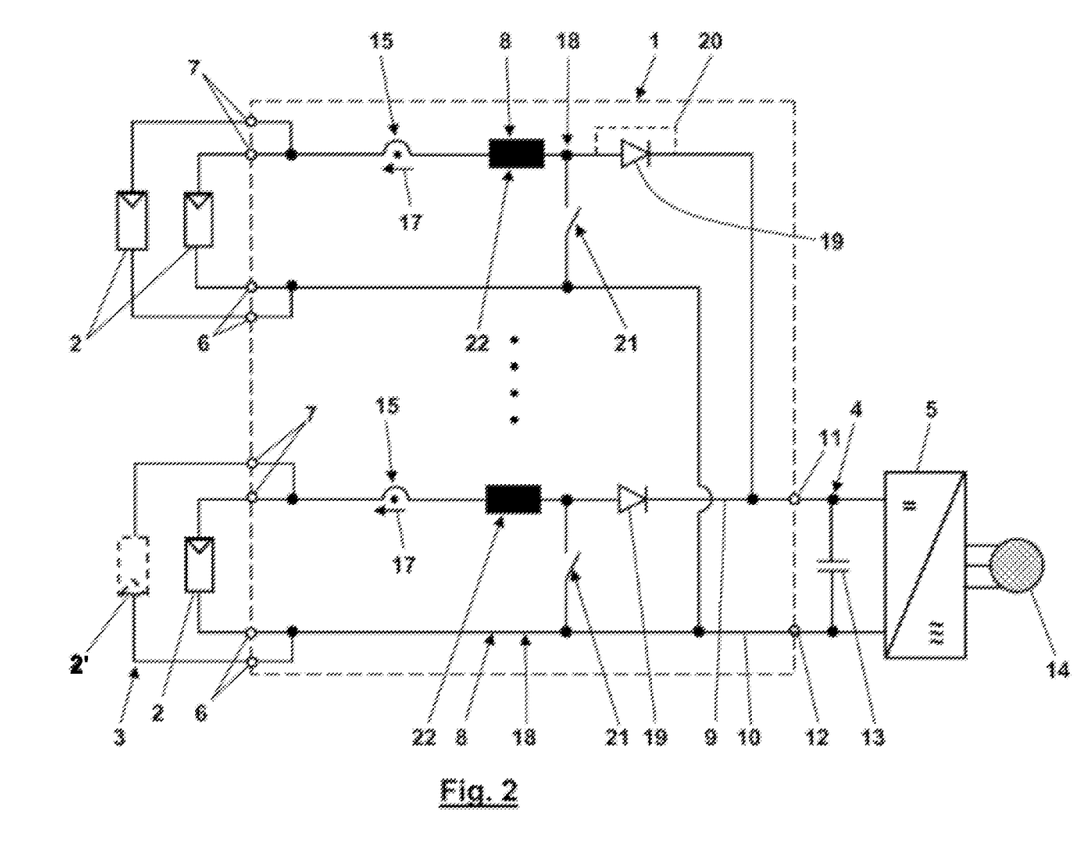
FIG. 2 shows a block diagram of a specific form of embodiment of the device according to the disclosure, also connected between strings of a photovoltaic generator and the intermediate input circuit of an inverter, in which two different potential faults are illustrated.

FIG. 2 represents a device 1 with only two DC/DC converters 8 which, in this instance, is specifically configured as a boost converter 18. Here again, the number of DC/DC converters 8 may be greater. Each DC/DC converter 8 is again provided with two terminals 7 and two terminals 6 for each respective string 2. Again, the terminals 7 might be combined in one terminal 7, if the associated string 2 is already connected in parallel outside the device 1. Otherwise, the basic design of the device 1 corresponds to that represented in FIG. 1.

However, by the configuration of the DC/DC converters 8 as boost converters 18, the boost converter diodes thereof 19 basically act as blocking devices for reverse currents from the DC link 4 to the strings 2 connected to the relevant DC/DC converter 8. In principle, therefore, such reverse currents can only occur if a boost converter diode 19 is defective. In the upper DC/DC converter 8 shown in FIG. 2, this is represented by a short-circuit path 20, indicated by a dashed line, which is shown parallel to the boost converter diode 19. As a result of the defect in this boost converter diode 19, the boost converter 18 also becomes entirely functionless, and if the voltage in the DC link 4 is higher than the corresponding string voltage, a reverse current will flow in the connected strings 2. If this reverse current is detected by the current sensor 15, the control system, which is not represented here, will close the boost converter switches 21 on all the remaining DC/DC converters 8, in order to short-circuit the strings 2 connected thereto. Consequently, these will no longer charge the intermediate circuit capacitor 13, and the reverse current will be inhibited after the voltage of the intermediate circuit capacitor 13 has been reduced to a sufficient degree by discharging associated with the reverse current. If the control system simultaneously opens the boost converter switch 21 of the DC/DC converter 8 on which the reverse current 15 has occurred, the strings 2 connected thereto will at least be able to maintain a background charge on the intermediate circuit capacitor 13 of the DC link 4. This background charge will be sufficient for the minimum supply of monitoring and signaling systems of the device 1, which are not represented in greater detail here, or of the inverter 5, in order to permit the more detailed analysis of the reverse current fault arising, the clearance and/or the upward referral thereof.

In principle, a reverse current through one of the current sensors 15 may also occur if both of the strings 2 connected to the corresponding DC/DC converter 8 are connected with an incorrect polarity which, again, will not be a case considered in the exclusive appraisal of fail-safety. This reverse current will flow via the associated boost converter switch 21 which, in general, will only exercise a forward blocking function. This reverse current cannot be inhibited by the control system, by the opening of the boost converter switches 21 on the remaining DC/DC converters 8, although it may be detected by the control system. As such, a reverse current flowing through a DC/DC converter 8 of two strings 2 connected thereto with an incorrect polarity will not be critical, as it will not exceed the current which will flow upon the short-circuiting of the strings connected to one of the remaining DC/DC converters by means of the boost converter switch thereof.

On the lower DC/DC converter 8 represented in FIG. 2, it is shown that not both, but only one string 2' is connected with an incorrect polarity. In general, this will not generate a reverse current detected by the associated current sensor 15, but will result in a current flowing in the circuit formed by both the strings 2 and 2' connected to the DC/DC converter 8. The connection of only two strings 2 and 2' restricts this current to a harmless level. In the case of this fault, the current sensor 15 will detect that no current is flowing through the DC/DC converter 8, even though, under the conditions considered, a current should be flowing.

Figure 3:
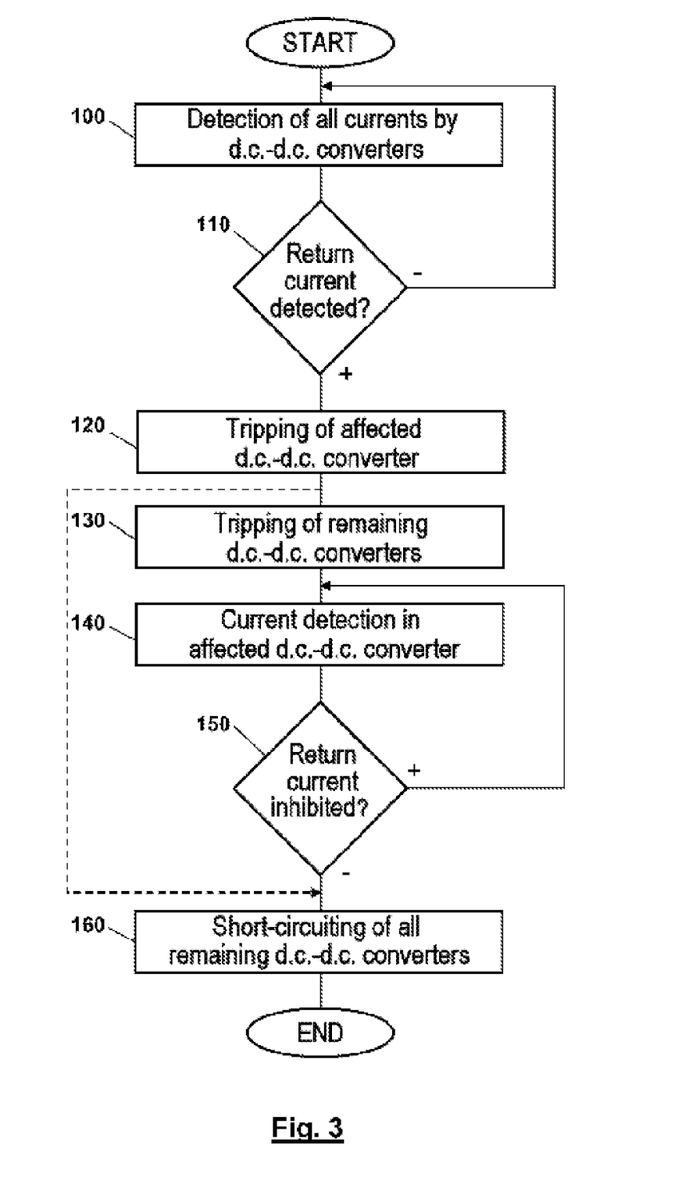
FIG. 3 shows a flow diagram for one form of embodiment of the method according to the disclosure.

FIG. 3 shows a potential form of embodiment of the method according to the disclosure, represented by a flow diagram. In a first act 100, the currents flowing through each of the DC/DC converters are detected. At 110, these currents are then checked for the occurrence of a reverse current. If no reverse current is detected (− at 110), the method branches back to 100, and the detection of all currents is repeated subsequently. If the flow of a reverse current is detected through a DC/DC converter (+ at 110), the affected DC/DC converter is tripped at 120. Where the DC/DC converter is configured as a boost converter, the boost converter switch will also open. At 130, this tripping is also applied to the remaining DC/DC converters. Thereafter, at 140, the current flowing in the affected DC/DC converter is detected once more and, at 150, it is confirmed whether the reverse current has already been inhibited by the measures implemented. If this is the case, the method branches back to 140, and the current flowing through the affected DC/DC converter is checked on a regular basis, as it is possible for the reverse current to recur.

If the reverse current cannot be inhibited by the tripping of all the DC/DC converters, the unaffected DC/DC converters will be short-circuited at 160, i.e. controlled in such a way that they will feed no further current to the common intermediate circuit.

In a potential alternative, the method branches directly from act 120 to act 160. In this case, upon the occurrence of a reverse current, a state will be directly achieved in which only the affected string can still feed current to the intermediate circuit. This will reliably terminate the reverse current situation. Conversely, in acts 130, 140 and 150, an intermediate state is achieved, in which all the strings will potentially feed current to the intermediate circuit, and in which all strings will be at the same service voltage, as all the DC/DC converters have been tripped. In many cases, this will be sufficient to terminate the reverse current situation.

Finally, it should once more be emphasized that, in the device 1, the flow of current from the strings 2 to the DC link 4 involves no electrical or electronic components, as these are not required anyway for the individual MPP tracking of the strings 2 connected to a given DC/DC converter 8.

Many variations and modifications may be made to the preferred embodiments of the disclosure without departing substantially from the spirit and principles of the disclosure. All such modifications and variations are intended to be included herein within the scope of the present disclosure, as defined by the following claims.

The invention claimed is:

1. A method for reverse current protection of a number of strings of a photovoltaic generator being connected to a common DC link in parallel in small groups respectively via a corresponding DC/DC converter, comprising:

detecting a current flowing via each of the DC/DC converters; and inhibiting a reverse current flowing through one of the DC/DC converters by a control of the DC/DC converter in response to the detection, wherein the reverse current flowing through one of the DC/DC converters is inhibited by a control of the remaining DC/DC converters not having a reverse current, thereby interrupting the flow of current from the strings connected thereby to the common DC link.

2. The method as claimed in claim 1, wherein the small groups each comprise two or three strings.

3. The method as claimed in claim 1, wherein the DC/DC converters are configured as boost converters, and wherein the reverse current flowing through one of the DC/DC converters is inhibited by a continuous opening or closure of the boost converter switches on the remaining DC/DC converters not having a reverse current.

4. The method as claimed in claim 3, further comprising:

initially opening the boost converter switches of the remaining DC/DC converters not having a reverse current;

confirming whether the reverse current has been inhibited accordingly; and closing the boost converter switches of the remaining DC/DC converters if the reverse current has not been inhibited by the opening of the boost converter switches of the remaining DC/DC converters.

5. The method as claimed in claim 4, further comprising:

opening a boost converter switch of the DC/DC converter, in which the reverse current has occurred if the reverse current has been inhibited by the closure of the boost converter switches of the remaining DC/DC converters.

6. The method as claimed in claim 1, further comprising generating a fault signal in response to a reverse current.

7. A device for reverse current protection of a number of strings of a photovoltaic generator being connected to a common DC link in parallel in small groups respectively via a corresponding DC/DC converter, comprising:

a current sensor configured to detect a current flowing via a respective DC/DC converter; and a central control system configured to inhibit a flow of a reverse current through one of the DC/DC converters by the control of one of the DC/DC converters, wherein the central control system is configured to inhibit the reverse current flowing through the one of the DC/DC converters by a control of the remaining DC/DC converters not having the reverse current, thereby interrupting the flow of current from the strings connected thereby to the common DC link.

8. The device as claimed in claim 7, wherein the small groups are each comprised of two or three strings.

9. The device as claimed in claim 7, wherein the DC/DC converters are configured as boost converters.

10. The device as claimed in claim 9, wherein the control system is configured to inhibit the reverse current flowing through the one of the DC/DC converters by a continuous opening or closure of boost converter switches of the remaining DC/DC converters not having the reverse current.

11. The device as claimed in claim 10, wherein the control system is configured such that when the boost converter switches of the remaining DC/DC converters are initially opened, and it is confirmed whether the reverse current in the one of the DC/DC converters has been inhibited accordingly, the boost converter switches of the remaining DC/DC converters are then closed, if the reverse current has not been inhibited by the opening of the boost converter switches of the remaining DC/DC converters.

12. The device as claimed in claim 9, wherein the control system is configured to open a boost converter switch on the DC/DC converter in which the reverse current has occurred, if the reverse current has not been inhibited by the closure of the boost converter switches of the remaining DC/DC converters.

13. The device as claimed in claim 7, wherein the control system is configured to generate a fault signal in response to the occurrence of a reverse current.

14. A method for reverse current protection of a number of strings of a photovoltaic generator being connected to a common DC link in parallel in small groups respectively via a corresponding DC/DC converter, comprising:
    detecting a current flowing via each of the DC/DC converters; and
inhibiting a reverse current flowing through one of the DC/DC converters by a control of the DC/DC converter in response to the detection,
    wherein the DC/DC converters are configured as boost converters, and wherein the reverse current flowing through one of the DC/DC converters is inhibited by a continuous opening or closure of the boost converter switches on the remaining DC/DC converters not having a reverse current.

15. The method as claimed in claim 14, further comprising:
    initially opening the boost converter switches of the remaining DC/DC converters not having a reverse current;
    confirming whether the reverse current has been inhibited accordingly; and
    closing the boost converter switches of the remaining DC/DC converters if the reverse current has not been inhibited by the opening of the boost converter switches of the remaining DC/DC converters.

16. The method as claimed in claim 15, further comprising:
    opening a boost converter switch of the DC/DC converter, in which the reverse current has occurred if the reverse current has been inhibited by the closure of the boost converter switches of the remaining DC/DC converters.

* * * * *